United States Patent
Hofmann et al.

(10) Patent No.: US 6,416,137 B2
(45) Date of Patent: Jul. 9, 2002

(54) HYDRAULIC VEHICLE BRAKE SYSTEM

(75) Inventors: Dirk Hofmann, Ludwigsburg; Martin Pfau, Weissach, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/742,011

(22) Filed: Dec. 22, 2000

(30) Foreign Application Priority Data

Dec. 30, 1999 (DE) .......................................... 199 63 760

(51) Int. Cl.[7] ................................................. B60T 8/34
(52) U.S. Cl. .................................. 303/113.4; 303/113.2
(58) Field of Search ........................... 303/113.1, 113.2, 303/113.3, 113.4, 113.5, 116.1, 116.2, 119.1, 119.2, DIG. 3, DIG. 4, 900, 901; 188/355, 356, 357, 358, 359

(56) References Cited

U.S. PATENT DOCUMENTS 5,397,174 A * 3/1995 Willmann ................. 303/113.5
5,544,948 A * 8/1996 Schmidt et al. ........... 303/122.11
5,588,718 A * 12/1996 Winner et al. ............. 303/113.1
6,149,247 A * 11/2000 Hofmann et al. .......... 303/113.4

FOREIGN PATENT DOCUMENTS

WO    WO-98/31576   * 7/1998

* cited by examiner

*Primary Examiner*—Pam Rodriguez
(74) *Attorney, Agent, or Firm*—Ronald E. Greigg

(57) ABSTRACT

The invention relates to a hydraulic vehicle brake system (10), having a hydraulic pump (12) and a high-pressure hydraulic reservoir (22) for external-force braking, as well as a conventional master cylinder (28), which serves as a set-point brake force transducer for the external-force braking and serves the purpose of muscle-powered secondary braking if the external-force service brake system fails. To embody the vehicle brake system (19) with an active pedal travel simulator, the invention proposes connecting the master cylinder (28) to a low-pressure hydraulic reservoir (26) via a disconnecting valve (30) and to the high-pressure hydraulic reservoir (22) via a return valve (32).

11 Claims, 2 Drawing Sheets

US 6,416,137 B2

HYDRAULIC VEHICLE BRAKE SYSTEM

FIELD OF THE INVENTION

The invention relates to a hydraulic vehicle brake system, and particularly to an improved brake system of the type having an external-force service brake system and a muscle-powered secondary brake system.

BACKGROUND OF THE INVENTION

A vehicle brake system of the type with which this invention is concerned is known from International Patent Disclosure WO 98/31576. For external-force braking, this known vehicle brake system has a hydraulic pump as well as a high-pressure hydraulic reservoir, connected to a pressure side of the hydraulic pump, with which reservoir, wheel brake cylinders can be subjected to pressurized brake fluid via pressure buildup valves for the sake of the external-force braking. To lower the pressure in the wheel brake cylinders, these wheel brake cylinders are connected via pressure reduction valves to a low-pressure hydraulic reservoir that is disposed on an intake side of the hydraulic pump. With the pressure buildup valves and pressure reduction valves, antilock and slip control are possible in a manner known per se by modulation of the brake pressure in the wheel brake cylinders.

For secondary braking, the known vehicle brake system has a master cylinder, with which the wheel brake cylinders can be actuated directly. The secondary braking is provided in the event of a failure of the external-force service brake system. In the function of the external-force service brake system, during braking the master cylinder is disconnected from the wheel brake cylinders by disconnecting valves; that is, in the event of the external-force braking, the pressure buildup in the wheel brake cylinders is not accomplished with the master cylinder but rather solely with the hydraulic pump. In the case of the external-force braking, the master cylinder acts as a set-point transducer for a pressure to be established in the wheel brake cylinder, or in other words for the braking force.

During an external-force braking with disconnecting valves closed, to obtain an actuating travel at the master cylinder, the known vehicle brake system has a so-called active pedal travel simulator. The pedal travel simulator includes not only the master cylinder, the low-pressure hydraulic reservoir and high-pressure hydraulic reservoir, but also two pedal travel valves, which are disposed one between the low-pressure hydraulic reservoir and the master cylinder and one between the high-pressure hydraulic reservoir and the master cylinder. Upon actuation of the master cylinder, brake fluid can be positively displaced out of the master cylinder into the low-pressure hydraulic reservoir by opening the one pedal travel valve, in order to obtain an actuating travel at the master cylinder. A requisite actuating force is controlled with the pedal travel valve, as a function of an actuating travel of the master cylinder, in such a way that a conventional or desired pedal travel/pedal force characteristic is attained. For restoration of the master cylinder, the other pedal travel valve is opened, and the master cylinder is restored by brake fluid from the high-pressure hydraulic reservoir. The restoring force is controlled by this pedal travel valve.

The known vehicle brake system just described has the disadvantage of having a large number of valves. Another disadvantage is that brake circuit disconnection is not possible.

SUMMARY OF THE INVENTION

To embody an active pedal travel simulator, the vehicle brake system according to the invention has a disconnecting valve by way of which the master cylinder communicates with the low-pressure hydraulic reservoir, and a return valve by way of which the master cylinder communicates with the high-pressure hydraulic reservoir. This makes for economy by dispensing with pedal travel valves. The external-force braking is done, as in the known vehicle brake system, by subjecting the wheel brake cylinders to pressure from the high-pressure hydraulic reservoir, which is filled by use of the hydraulic pump. The master cylinder serves as a set-point brake force transducer. By means of the disconnecting valves, upon actuation of the master cylinder, brake fluid is let out of the master cylinder into the low-pressure hydraulic reservoir, and the quantity of brake fluid released can be controlled with the disconnecting valve, so that a desired actuating travel/actuating force characteristic at the master cylinder can be established, which imparts a familiar or desired brake actuation feeling to the driver in the external-force braking. A restoration of the master cylinder is accomplished by opening the return valve with brake fluid from the high-pressure hydraulic reservoir; the restoring force of the master cylinder can be controlled with the return valve. Another advantage of the vehicle brake system of the invention is that it can be embodied as a multi-circuit brake system, with mutually independent brake circuits, thus enhancing the safety of the vehicle brake system.

BRIEF DESCRIPTION OF THE DRAWINGS

The invention will be better understood and further objects and advantages thereof will become more apparent from the ensuing detailed description of preferred embodiments taken in conjunction with the drawing, in which.

DESCRIPTION OF THE PREFERRED EMBODIMENTS

Figure 1:
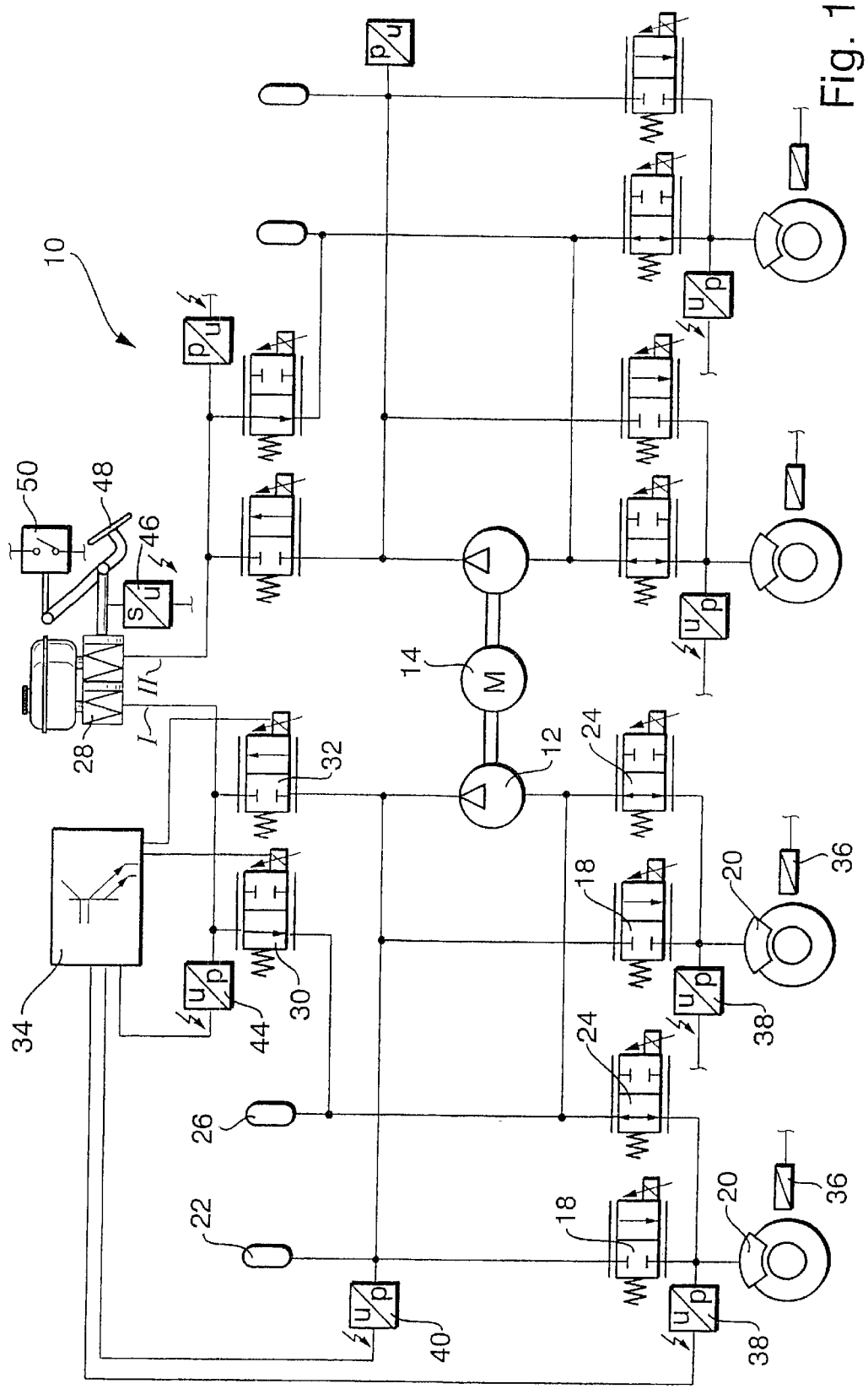
FIG. 1 is a hydraulic circuit diagram of a vehicle brake system according to the invention.

The secondary brake system 10 according to the invention shown in FIG. 1 is embodied as a dual-circuit brake system, with two mutually independent brake circuits I, II. The vehicle brake system 10 will hereinafter be explained in terms of the brake circuit I shown on the left in the drawing; the brake circuit II shown on the right is constructed in the same way and functions identically. The vehicle brake system 10 has an external-force service brake system and a muscle-powered secondary brake system. It is also embodied with anti-lock and slip control features.

The external-force service brake system has one hydraulic pump 12 for each brake circuit I, II; the hydraulic pumps can be driven by a common electric motor 14. A number of wheel brake cylinders 20, two of which are shown in each brake circuit I, II, are connected to the pressure side of the hydraulic pump 12, each via its own pressure buildup valve 18. A high-pressure hydraulic reservoir 22 is also provided on the pressure side of the hydraulic pump 12.

The wheel brake cylinders 20 are connected to an intake side of the hydraulic pump 12, each via its own pressure reduction valve 24. A low-pressure hydraulic reservoir 26 is provided on the intake side of the hydraulic pump 12.

The muscle-powered secondary brake system of the vehicle brake system 10 according to the invention includes a pedal-actuated dual-circuit master cylinder 28, to which the two brake circuits I, II are connected, each via a respective disconnecting valve 30. Via the disconnecting valves 30, the master cylinder 28 is connected to the pressure reduction valves 24 and thus to the wheel brake cylinders 20, which are also part of the secondary brake system. The low-pressure hydraulic reservoir 26 is likewise connected to the master cylinder 28 via the disconnecting valve 30. The secondary braking system also has a return valve 32, which is disposed between the pressure side of the hydraulic pump 12 and the master cylinder 28.

The magnetic valves 18, 24, 30, 32 of the vehicle brake system 10 of the invention are embodied as 2/2-way valves, specifically as proportional magnetic valves. The pressure reduction valves 18 and the return valve 32 are closed in their de-energized or basic position; the pressure reduction valves 24 and the disconnecting valves 30 are open in their de-energized or basic position. The de-energized or basic positions of the magnet valves 18, 24, 30, 32 are selected on the one hand such that upon an intrinsically intended external-force braking, all the magnet valves 18, 24, 30, 32 are actuated, or energized or switched into a switching or intermediate position in which current is supplied. As a result, the functioning of all the magnetic valves 18, 24, 30, 32 can be ascertained upon each instance of external-force braking, and thus defective magnet valves 18, 24, 30, 32 can be detected early and repaired or replaced. This enhances the safety as well as operational readiness of the vehicle brake system 10 of the invention. Furthermore, the basic position of the magnetic valves 18, 24, 30, 32 is selected such that in the event of a power failure, muscle-powered secondary braking is possible by actuation of the master cylinder 28. Once again, this is advantageous for safety reasons and moreover is prescribed.

The control of the magnetic valves 18, 24, 30, 32 and of the electric motor 14 for driving the hydraulic pumps 12 is effected by means of an electronic control unit 34, which receives signals both from wheel rotation sensors 36 associated with each brakable vehicle wheel, and from pressure sensors 38, 40. The pressure sensors 38 are connected to the wheel brake cylinders 20, and the pressure sensors 40 are connected to the high-pressure hydraulic reservoir 22. For cost reasons, no pressure sensor is connected to the low-pressure hydraulic reservoir 26, although this would be possible in principle. A further pressure sensor 44 is connected directly to the master cylinder 28. The electronic control unit 34 also receives a signal from a pedal travel sensor 46, with which signal a pedal travel produced by brake pedal 48 being depressed to actuate the master cylinder 28 can be ascertained. The electronic control unit 34 furthermore receives a signal from a so-called brake light switch 50, with which it can be ascertained whether the brake pedal 48 is actuated.

External Force Braking

An external-force braking takes place with brake fluid under pressure from the high-pressure hydraulic reservoir 22 by opening of the pressure buildup valves 18; the pressure reduction valves 24 are closed during the external-force braking. To assure that brake fluid at adequate pressure will always be on hand in the high-pressure hydraulic reservoir 22, the hydraulic pump 12 is switched on when the pressure in the high-pressure hydraulic reservoir 22, measurable with the pressure sensor 40, drops below a predetermined set-point value. The hydraulic pump 12 can be turned off if the pressure in the high-pressure hydraulic reservoir 22 exceeds a (higher) set-point value. The hydraulic pump 12 aspirates brake fluid from the low-pressure hydraulic reservoir 26 or, through the open disconnecting valve 30, from the master cylinder 28. Since brake fluid is stored under pressure in the high-pressure hydraulic reservoir 22, brake fluid under adequate pressure for braking is always available, and thus for external-force braking, there is no need first to wait for the hydraulic pump 12 to start up or to wait for a pressure buildup by means of the hydraulic pump 12.

In the external-force braking, the master cylinder 28 forms a set-point value transducer for a braking force, and thus for a brake pressure to be established in the wheel brake cylinders 20. As the set-point value, the pedal travel of the brake pedal 48, measured with the pedal travel sensor 46, or a pressure generated in the master cylinder 28, which can be measured with the pressure sensor 44 connected to the master cylinder 28, is used. This pressure sensor is present in redundant form in both brake circuits I, II, and recourse can be had to it even if the pedal travel sensor 46 should fail. Upon depression of the brake pedal 48, the disconnecting valve 30, embodied as a proportional valve, is closed far enough that a pedal force that increases with the pedal travel results, which can be ascertained with the pressure sensor 44, connected to the master cylinder 28, that measures the pressure, proportional to the pedal force, in the master cylinder 28. Any desired pedal force/pedal travel characteristic at the brake pedal 48 can be established by control of the disconnecting valve 30 on the part of the electronic control unit 34. The pedal force/pedal travel characteristic can be varied in a simple way and thus adapted to different vehicles or to the wishes of a driver, by varying a control algorithm of the electronic control unit 34.

To enable lowering of the brake pressure, in the event of anti-lock control if one or more vehicle wheels is threatening to lock, as will be described hereinafter, in the wheel brake cylinder 20 of the system by opening the associated pressure reduction valve 24, the low-pressure hydraulic reservoir 26 must always be virtually pressureless. For this reason, the hydraulic pump 12, which pumps brake fluid out of the low-pressure hydraulic reservoir 26 into the high-pressure hydraulic reservoir 22, is switched on when the brake pedal 48 is depressed, which can be ascertained with the brake light switch 50 and redundantly with the pedal travel sensor 46.

So that the pressure in the low-pressure hydraulic reservoir 26 will not exceed the set-point value, a spring, not shown, of the low-pressure hydraulic reservoir 26 that acts on a piston, also not shown, of the low-pressure hydraulic reservoir 26 is designed such that the pressure in the low-pressure hydraulic reservoir 26 does not reach the set-point value until at a maximum stroke of its piston. Not until the piston of the low-pressure hydraulic reservoir 26 has reached its terminal position, which does not occur in normal function of the vehicle brake system 10, can the pressure in the low-pressure hydraulic reservoir 26 be raised above the set-point value. If desired or if necessary, the pressure in the low-pressure hydraulic reservoir 26 can be jointly calculated with the electronic control unit 34, since the brake fluid volume positively displaced from the master cylinder 28 by pedal actuation can be ascertained with the pedal travel sensor 46, and the brake fluid volumes contained in the high-pressure hydraulic reservoir 22 and in the wheel brake cylinders 20 can be ascertained with the wheel brake cylinder pressure sensors 38, 40. Elasticities in the vehicle brake system 10 must be taken into account as applicable in ascertaining the pressure in the low-pressure hydraulic reservoir 26. A pressure sensor for the low-pressure hydraulic reservoir 26 can therefore be dispensed with.

Accordingly, brake fluid which is positively displaced from the master cylinder 28 by its actuation through the partly open disconnecting valve 30 into the low-pressure hydraulic reservoir 26 is pumped without delay by the hydraulic pump 12 into the high-pressure hydraulic reservoir 22. The brake pressure in the wheel brake cylinders 20 is regulated with the pressure buildup valves 18, embodied as proportional valves, as a function of the brake pedal travel measured by the pedal travel sensor 46; the pressure in each wheel brake cylinder 20 is measured with its assigned pressure sensor 38. If the pressure in one or more wheel brake cylinders 20 exceeds the set-point value predetermined by the pedal travel, then the pressure is decreased by opening of the applicable pressure reduction valve 24.

In a return motion of the actuated brake pedal 48, the return valve 32 is opened such that a pressure corresponding to the pedal travel prevails in the master cylinder 28, and the requisite volume of brake fluid flows out of the high-pressure hydraulic reservoir 22 into the master cylinder 28. The pressure in the master cylinder 28 and thus the pedal force are accordingly controlled with the return valve 32 as the brake pedal 48 executes its return travel. Thus with the disconnecting valve 30 and the return valve 32, a so-called active pedal travel simulator is realized: Upon an external-force braking, in which the braking energy is made available by the hydraulic pump 12 rather than by the master cylinder 28, brake fluid is positively displaced from the master cylinder 28 by the disconnecting valve 30 into the low-pressure hydraulic reservoir 26 when the brake pedal 48 is stepped on, and in the return travel of the brake pedal 48, the corresponding quantity of brake fluid is returned to the master cylinder 28 from the high-pressure hydraulic reservoir 22 by the return valve 32, so that a desired pedal travel and a pedal force dependent thereon result.

An external-force braking is still possible even if the pedal travel sensor 46 fails. The failure of the pedal travel sensor 46 is readily apparent from the brake light switch 50. In that case, upon depression of the brake pedal 48, the disconnecting valve 30 is closed, and the pressure generated in the master cylinder 28 by depression of the brake pedal 48 is used as the set-point value for the brake force; this pressure can be measured with the pressure sensor 44 connected to the master cylinder 28. Since the pressure sensor 44 is redundantly present in each brake circuit I, II, an external-force braking is possible even if not only the pedal travel sensor 46 but also one of the two pressure sensors 44 connected to the master cylinder 28 fails. Since when the disconnecting valve 30 is closed, no brake fluid can be positively displaced from the master cylinder 28, virtually no further pedal travel is possible at the brake pedal 48. This means that with the failed pedal travel sensor 46, the function of the active pedal travel simulator is no longer available. Nevertheless, metered external-force braking is still possible, since the brake pressure in the wheel brake cylinders 20, with the failure of the pedal travel sensor 46, is regulated as a function of the pressure in the master cylinder 28, which is dependent on the pedal force with which the brake pedal 48 is depressed.

Anti-lock or slip control is done for individual wheels in a manner known per se by a brake pressure modulation in the wheel brake cylinders, with the pressure buildup valves and pressure reduction valves 18, 24. The tendency of the vehicle wheels to lock or slip is ascertained by the electronic control unit 34 with the wheel rotation sensors 36.

As the above explanation of the vehicle brake system 10 of the invention shows, upon each external-force braking, all the magnetic valves 18, 24, 30, 32 are actuated; a malfunction of one or more magnetic valves 18, 24, 30, 32 can therefore be ascertained by the electronic control unit 34 upon each external-force braking. This averts an unnoticed failure of a magnetic valve 18, 24, 30, 32 of the vehicle brake system 10, in which the failure would not be noticed until the magnetic valve 18, 24, 30, 32 is needed, yet by then is unavailable. As a result, the vehicle brake system 10 is highly safe. Its great redundancy, with the two mutually independent brake circuits I, II and its embodiment as a closed system, lead to high safety of the vehicle brake system 10 according to the invention.

Secondary Brake System

The vehicle brake system 10 of the invention has a muscle-powered secondary brake system. The secondary brake system comes into operation if the external-force service brake system fails. The external-force service brake system can fail for instance from a defect of the hydraulic pump 12, its electric motor 14, or a power failure of the vehicle brake system 10. In that case, the magnetic valves 18, 24, 30, 32 remain in their basic position shown in FIG. 1. Upon actuation of the master cylinder 28, because of the disconnecting valve 30 that is open in the basic position and the pressure reduction valves 24 that are also open in the basic position, the master cylinder acts directly on the wheel brake cylinders 20, so that braking by muscle power is possible. Since because of the open disconnecting valve 30 the master cylinder 28 also acts on the low-pressure hydraulic reservoir 26, its volume 26 must be so small that a brake pressure that is necessary and adequate for braking can be built up in the wheel brake cylinders 20 by means of the master cylinder 28. In the muscle-powered secondary braking, the piston, not shown, of the low-pressure hydraulic reservoir 26 reaches its terminal position after part of the piston travel of the master cylinder 28. Since the piston with the low-pressure hydraulic reservoir 26 cannot be displaced any further, the pressure in the low-pressure hydraulic reservoir 26 and also in the wheel brake cylinders 20 increases as the brake pedal 48 is depressed further. A volume of the low-pressure hydraulic reservoir 26 is designed such that a legally prescribed minimum delay when the brake pedal 48 is completely depressed is attained or exceeded.

If the external-force service brake system in only one of the two brake circuits I, II fails, external-force braking is still possible, unchanged, in the other brake circuit I, II. In that case, the brake pressure in the wheel brake cylinders 20 of the brake circuit I, II that is braked with external force can be increased with the electronic control unit 34; that is, the dependency of the brake pressure in the wheel brake cylinders 20 on the pressure in the master cylinder 28 is varied, in order to relieve the driver in depressing the brake pedal 48.

Figure 2:
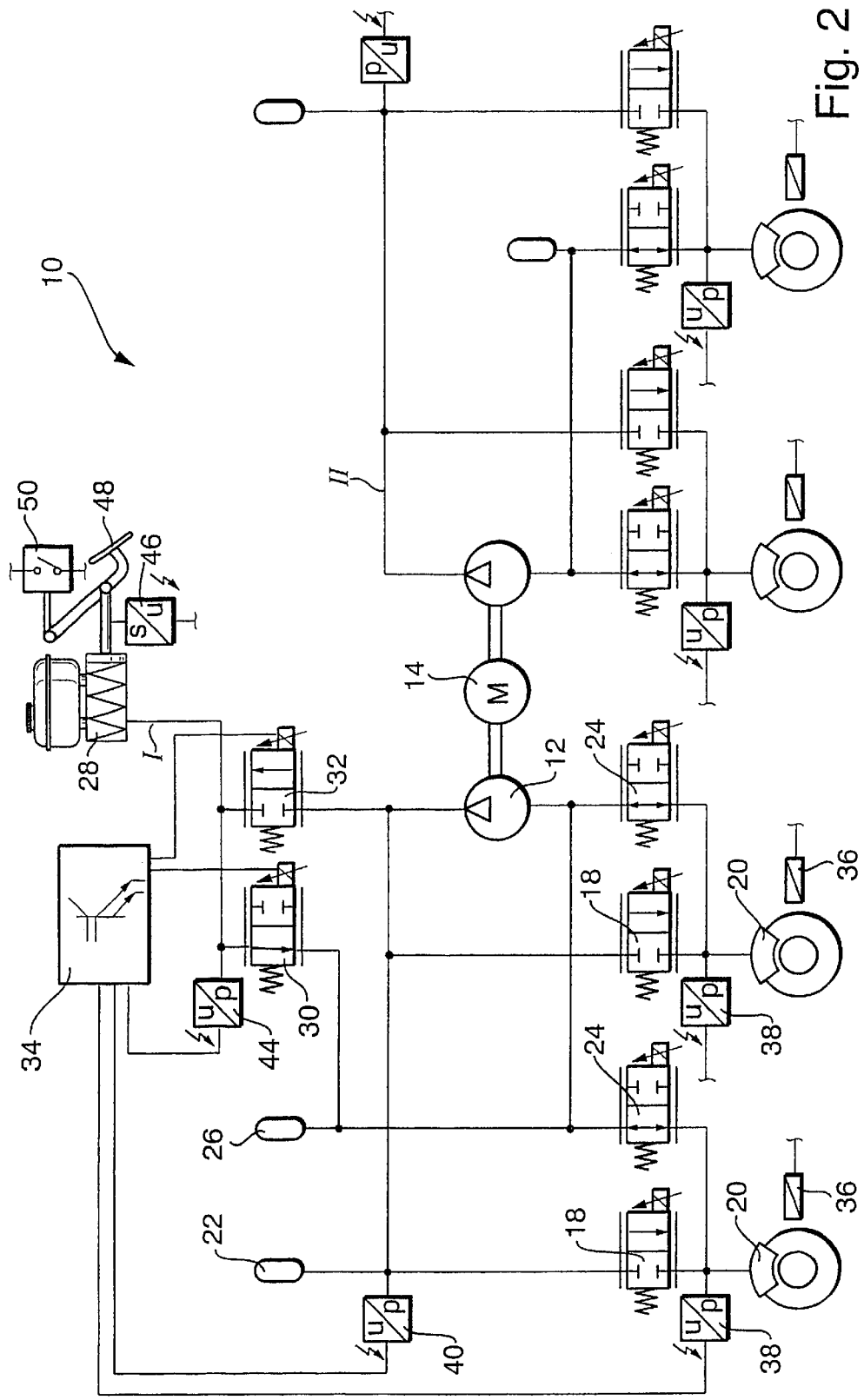
FIG. 2 is a hydraulic circuit diagram of a simplified embodiment of the vehicle brake system according to the invention of FIG. 1.

Referring now to FIG. 2 a simplified embodiment of the vehicle brake system 10 will be described. To avoid repetition, only the differences between FIG. 2 and FIG. 1 will be explained below, and for the rest, reference will be made to the discussion of FIG. 1. For identical components, the same reference numerals are used in both FIGS. 1 and 2.

The vehicle brake system 10 of the invention shown in FIG. 2 has a single-circuit master cylinder 28, to which a brake circuit I is connected, via the disconnecting valve 30 and the return valve 32, in the manner described above for FIG. 1. The other brake circuit II, in the vehicle brake system 10 shown in FIG. 2, is not connected to the master cylinder 28. As a result, with the brake circuit II only an external-force braking is possible, but not secondary braking by muscle power with the master cylinder 28. Muscle-powered secondary braking accordingly occurs solely with the brake circuit I. The external-force braking takes place, in the manner described in conjunction with FIG. 1, to the full extent with both brake circuits I, II. The function of the active pedal travel simulator is also available without restriction; this function is realized solely in the brake circuit I connected to the master cylinder 28.

In the vehicle brake system 10 shown in FIG. 2, the disconnecting valve 30 and the return valve 32 are omitted in the brake circuit II not connected to the master cylinder 28. Otherwise, the master cylinder 28 is embodied as a single-circuit brake cylinder and is therefore less expensive than the dual-circuit master cylinder 28 of the vehicle brake system 10 shown in FIG. 1. A further advantage of the vehicle brake system 10 shown in FIG. 2 is, because the low-pressure hydraulic reservoir 26 is present only in brake circuit I, a more-favorable volumetric ratio between the master cylinder 28 and the low-pressure hydraulic reservoir 26 in the event of secondary braking by muscle power.

The foregoing relates to preferred exemplary embodiments of the invention, it being understood that other variants and embodiments thereof are possible within the spirit and scope of the invention, the latter being defined by the appended claims.

We claim:

1. A hydraulic vehicle brake system of the type having an external-force service brake system and a muscle-powered secondary brake system, comprising a master cylinder, a hydraulic pump, and a wheel brake cylinder connected to the pressure side of said pump via a pressure buildup valve and to the intake side of said pump via a pressure reduction valve, a low-pressure hydraulic reservoir connected to the intake side of the hydraulic pump, and a high-pressure hydraulic reservoir connected to the pressure side of the hydraulic pump, wherein the muscle-powered secondary brake system is disconnectable hydraulically from the wheel brake cylinder by means of an electronically triggerable valve device (30, 32), and wherein said master cylinder (28) communicates with said low-pressure hydraulic reservoir (26) and/or said high-pressure hydraulic reservoir (22) via said electronically triggerable valve device (30, 32).

2. The hydraulic vehicle brake system of claim 1, wherein said vehicle brake system (10) comprises a plurality of mutually independent brake circuits (I, II) and a separate hydraulic pump (12) in each brake circuit (I, II).

3. The hydraulic vehicle brake system of claim 1, wherein said electronically triggerable valve device (30, 32) comprises a disconnecting valve (30) and a return valve (32), said master cylinder (28) being connected to said low-pressure hydraulic reservoir (26) via said disconnecting valve (30), and to the high-pressure hydraulic reservoir (22) via said return valve (32).

4. The hydraulic vehicle brake system of claim 3, wherein one or more of said pressure building valve (18), said pressure reduction valve (24), said disconnecting valve (30) and said return valve (32) are magnet valves and are embodied as proportional valves.

5. The hydraulic vehicle brake system of claim 3, wherein said pressure buildup valve (18) and said pressure reduction valve (24) are open in a basic position, said disconnection valve (30) is open in a basic position, and/or said return valve (32) is closed in a basic position.

6. The hydraulic vehicle brake system of claim 3, wherein said vehicle brake system (10) further comprises a plurality of mutually independent brake circuits (I, II) and one single-circuit master cylinder (28), to which one of the brake circuits (I) is connected, and wherein said vehicle brake system (10) has only one disconnecting valve (30) and only one return valve (32), which are disposed in the brake circuit (I), which is connected to the master cylinder (28).

7. The hydraulic vehicle brake system of claim 1, wherein said vehicle brake system (10) further comprises a brake slip regulating device.

8. The hydraulic vehicle brake system of claim 1, further comprising means responsive to actuation of said master cylinder (28) for turning on said hydraulic pump (12).

9. The hydraulic vehicle brake system of claim 8, further comprising sensing means for sensing actuation travel of said master cylinder and wherein said electronically triggerable valve device (30, 32) is connected with said sensing means and operable to control the actuating force of said master cylinder as a function of actuation travel.

10. A method of operating a hydraulic vehicle brake system including an external-force service brake system and a muscle-powered secondary brake system , the vehicle brake system having a master cylinder, a hydraulic pump, a wheel brake cylinder connected to the pressure side of the pump via a pressure buildup valve and to the intake side of the pump via a pressure reduction valve, a low-pressure hydraulic reservoir connected to the intake side of the pump, a high-pressure hydraulic reservoir connected to the pressure side of the pump, wherein the muscle-powered secondary brake system is disconnectable hydraulically from the wheel brake cylinder by means of an electronically triggerable valve device (30, 32), and wherein the master cylinder communicates with the low-pressure hydraulic reservoir (26), and/or the high-pressure hydraulic reservoir via said electronically triggerable valve device (30, 32), the method comprising operating the hydraulic pump only when the master cylinder is actuated.

11. The method of claim 10, further comprising the steps of utilizing the disconnecting valve to control the actuating force of the master cylinder as a function of master cylinder actuating travel.

* * * * *